(12) United States Patent
Hubbert (10) Patent No.: US 11,300,653 B2
(45) Date of Patent: Apr. 12, 2022

(54) FREQUENCY COMPENSATION FOR CLUTTER FILTER BIAS TO RADAR DATA

(71) Applicant: University Corporation for Atmospheric Research, Boulder, CO (US)

(72) Inventor: John Clark Hubbert, Fort Collins, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 318 days.

(21) Appl. No.: 16/508,858

(22) Filed: Jul. 11, 2019

(65) Prior Publication Data
US 2021/0011117 A1 Jan. 14, 2021

(51) Int. Cl.
G01S 7/288 (2006.01)
G01S 7/292 (2006.01)

(52) U.S. Cl.
CPC ............ G01S 7/288 (2013.01); G01S 7/2925 (2013.01); *G01S 7/2883* (2021.05)

(58) Field of Classification Search
None
See application file for complete search history.

(56) References Cited

U.S. PATENT DOCUMENTS

| 7,773,029 B1 * | 8/2010 | Bachman | G01S 13/953 342/159 |
| 2005/0100076 A1 * | 5/2005 | Gazdzinski | H04B 1/7176 375/130 |
| 2008/0001808 A1 * | 1/2008 | Passarelli | G01S 13/5244 342/26 R |
| 2011/0144489 A1 * | 6/2011 | Kwak | G01S 15/8981 600/437 |
| 2019/0257944 A1 * | 8/2019 | Lee | A61B 8/463 |

OTHER PUBLICATIONS

Sebastian M. Torres et al, Ground Clutter Canceling with a Regression Filter, Journal of Atmospheric and Oceanic Technology, vol. 16, Oct. 1999, pp. 1364-1372, American Meteorological Society.
Sebastian Torres et al, Ground Clutter Canceling With a Regression Filter, National Severe Storms Laboratory Interim Report, Oct. 1998, 39 pages, NOAA , National Severe Storms Laboratory, Norman, Oklahoma.

* cited by examiner

*Primary Examiner* — Whitney Moore
(74) *Attorney, Agent, or Firm* — The Ollila Law Group LLC (57) ABSTRACT

A method and system for removing ground clutter data from time series radar data are provided. The method comprises receiving the time series radar data, applying a clutter filter to the time series radar data to generate a filtered time series radar data, applying a discrete Fourier transform to the filtered time series radar data to generate a filtered frequency domain data, determining a filter bias for one or more filter biased frequency domain frequencies of the filtered frequency domain data based on a frequency response of the clutter filter, and correcting the filtered frequency domain data by adding the filter bias to the filtered frequency domain data at the one or more filter biased frequency domain frequencies to generate a filtered and bias corrected frequency domain data.

10 Claims, 8 Drawing Sheets

FREQUENCY COMPENSATION FOR CLUTTER FILTER BIAS TO RADAR DATA

GOVERNMENT LICENSE RIGHTS

This invention was made with Government support under awards 20140711 awarded by the National Oceanic and Atmospheric Administration. The United States Government has certain rights in this invention.

TECHNICAL FIELD

The present Application is directed towards a system for providing compensation for filter biased radar data, and more particularly, to a frequency compensation for clutter filter biased radar data.

BACKGROUND

Weather radar data is critical to providing weather prediction and transportation safety guidance. Echoes from ground clutter can contaminate weather radar data, however, making it difficult to identify some weather events.

Ground clutter echo can be caused by anything that doesn't move, or that moves slowly, that a radar beam may encounter. For example, parked cars, buildings, trees, trees swaying due to wind, towers, wires, and terrain and power wires can cause ground clutter echo.

Errors caused by ground clutter echoes can cause air traffic controllers to needlessly reroute planes around non-existent storms, meteorologists to severely overestimate rainfall, and automated warning systems to generate erroneous flash flood alarms. Ground clutter echoes can further mask ongoing high-impact weather from detection, and generally confound the users of radar data.

Figure 1:
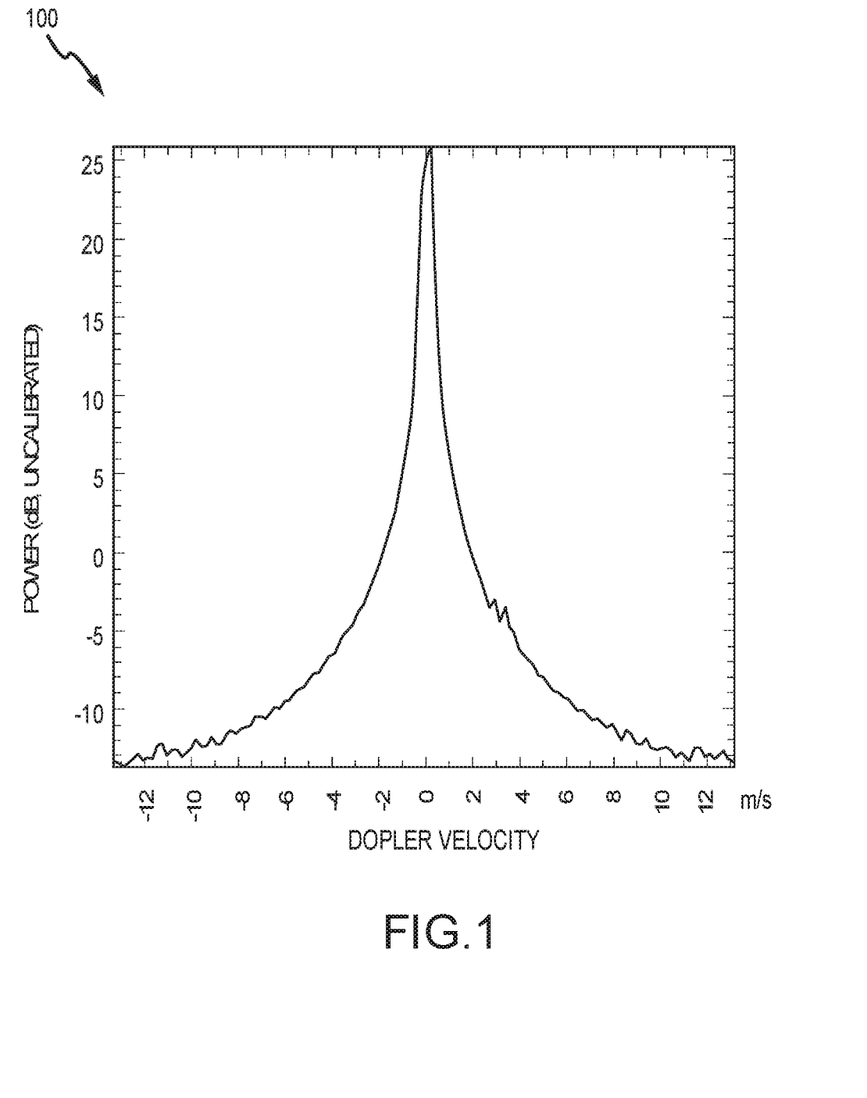
FIG. 1 depicts unfiltered clutter Doppler spectrum 100.

Ground clutter echoes tend to have a narrow spectrum width in the Doppler spectrum of the radar echo compared with weather signals, with a mean Doppler velocity of zero. For example, FIG. 1 depicts an example of unfiltered clutter Doppler spectrum 100. The x-axis of unfiltered clutter Doppler spectrum 100 is the Doppler velocity in meters per second, and the y-axis represents the power in decibels. As may be seen in FIG. 1, there is a peak centered on 0 m/s, with a half power bandwidth width of approximately 0.25 m/s. The peak represents the received power caused by the ground clutter echo that overlaying a weather signal in Doppler spectrum 100. The central power spike of Doppler spectrum 100 slopes off to a lower continuum at values as the magnitude of the Doppler velocity increases. The continuum area is where weather data with significantly less power than the ground clutter is located. Thus, it may be seen that a high percentage of ground clutter echo may be reduced if the spectral components in a hand centered at zero frequency, or zero Doppler velocity, are removed by a suitable high-pass filter.

Prior techniques to remove ground clutter from radar data have included applying a Doppler spectrum notch technique to a frequency domain version of the data. The Doppler spectrum notch technique applies a notch filter to the Doppler spectrum of the radar echo to eliminate the part of the Doppler spectrum around zero velocity. By setting the values around zero velocity to zero, much of the ground clutter may be removed. The desired radar variables may then be calculated from the remaining part of the Doppler spectrum. Using a Doppler spectrum notch filter removes low velocity weather data, however.

Other techniques have applied a clutter filter to the time series radar data. For example, some prior methods have weighted the time series radar data generated from the clutter echo (with possible weather echo overlaid) using a window function such as a von Hann window or a Blackman window. The time series radar data is then converted to the Doppler spectrum using a finite discrete Fourier Transform, and a spectrum notch filter is applied.

Another technique for removing ground clutter signals includes applying a regression filter to the time domain signal. One example of using a regression filter to remove ground clutter is provided by Torres, S. and D. Zrnic, 1999: Ground clutter canceling with a regression filter, J. Atmos. Oceanic Technol., 16, 1364-1372. Regression filters approximate their input signals with polynomial functions in the time domain and rely on the feature that the ground clutter echoes tend to vary slowly in time, whereas weather signals typically vary more rapidly in time. In order to remove the slowly varying ground clutter part of the signal from the time series radar data, a regression curve (i.e., a polynomial fit) is fitted to radar time series that represents a radar resolution volume and then the fitted curve is subtracted from the signal, leaving the rapidly-varying weather signal in the residual data.

One disadvantage to filtering time series radar data to remove clutter is that the filter can attenuate the signal and eliminate some of the information provided by the weather signal that is present, thereby biasing the filtered data. The biasing, or attenuation, which may translate to higher measurement standard deviations for the weather signal, has previously been accepted as a necessary feature when using either a frequency (i.e. Doppler) domain or time domain ground clutter filters.

What is needed is a way to preserve the underlying weather data from the bias caused by various ground clutter filtering techniques, without increasing the standard deviation of the radar variable estimates of the weather signal.

Aspects

A method for removing ground clutter data from tune series radar data is provided. The method comprises receiving the time series radar data, applying a clutter filter to the time series radar data to generate a filtered time series radar data, applying a discrete Fourier transform to the filtered time series radar data to generate a filtered frequency domain data, determining a filter bias for one or more filter biased frequency domain frequencies of the filtered frequency domain data based on a frequency response of the clutter filter, and correcting the filtered frequency domain data by adding the filter bias to the filtered frequency domain data at the one or more filter biased frequency domain frequencies to generate a filtered and bias corrected frequency domain data.

A system for removing ground clutter data from time series radar data is provided. The system comprises a data receiving module operable to receive time series radar data, a filtering module operable to apply a clutter filter to the time series radar data to generate a filtered time series radar data, a domain transfer module operable to apply a discrete Fourier transform to the filtered time series radar data to generate a filtered frequency domain data, and a bias removing module operable to determine a filter bias for one or more filter biased frequency domain frequencies of the filtered frequency domain data based on a frequency response of the clutter filter, and correct the filtered frequency domain data by adding the filter bias to the filtered frequency domain data at the one or more filter biased frequency domain frequencies to generate a filtered and bias corrected frequency domain data.

BRIEF DESCRIPTION OF THE DRAWINGS

The same reference number represents the same element on all drawings. The drawings are not necessarily to scale.

FIG. 4B depicts filtered time series radar data 450, in accordance with an

DETAILED DESCRIPTION

FIGS. 2-8 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 2:
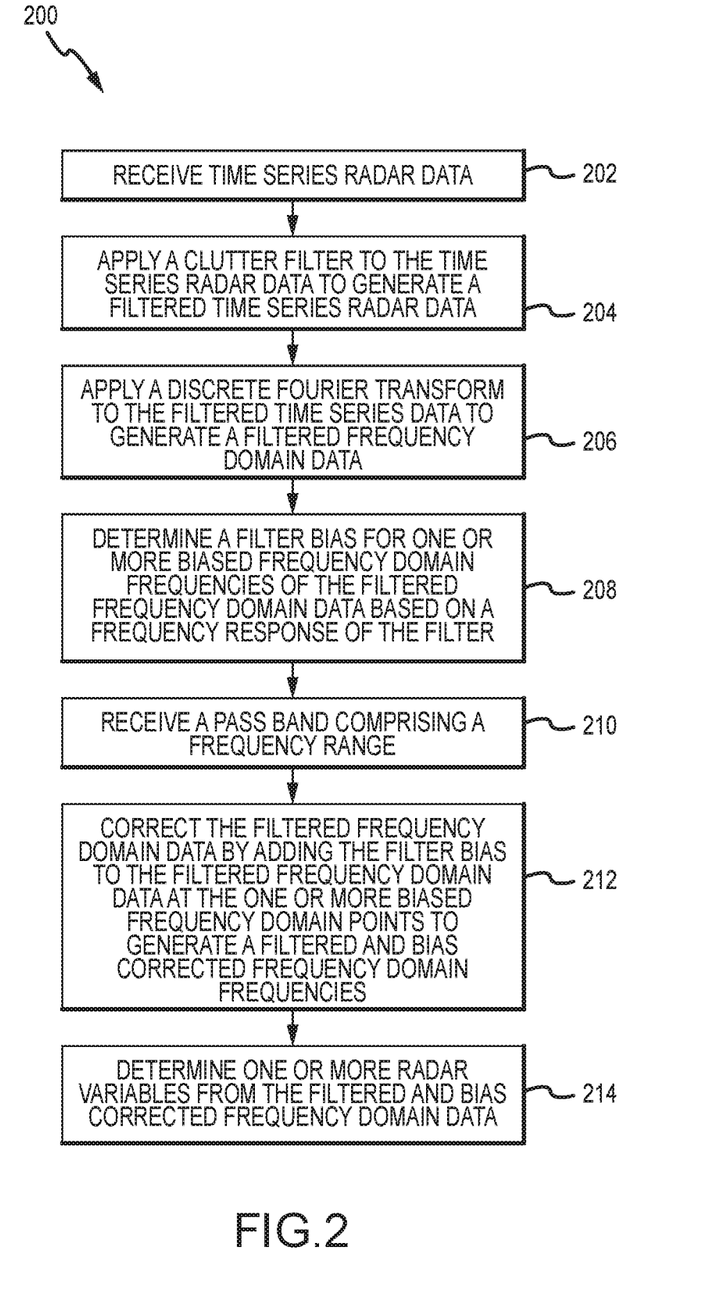
FIG. 2 depicts method 200, in accordance with an embodiment.

FIG. 2 depicts method 200, in accordance with an embodiment. Method 200 may be used to remove ground clutter from time series radar data. Method 200 begins with step 202. In step 202, time series radar data is received.

Radars typically conduct a raster scan by performing a first azimuthal scan, increasing or decreasing the elevation angle by 0.5-1.5 degrees, and performing a subsequent azimuthal scan.

At each radar antenna pointing direction in a scan, a radar transmits individual pulses and samples the return signal in time, which corresponds to a distance or range from the radar. Consecutive N samples at a particular range define a radar resolution volume. In this way, a series of resolution volumes over a radial range of depths along the pointing direction of the radar is defined. A typical pencil beam radar may have a 1-degree half power beam width, defining a radial cone, at a fixed azimuth and elevation, over a range of distances from the radar. The typical depth for a radar resolution volume is from 150 meters to 2.5 km. The N samples for a particular radar resolution volume comprise time series radar data for that resolution volume. Thus, for each sample time after the radar pulse, a series of time series is constructed for each resolution volume along the radial range from the radar.

For a Doppler radar, the time series radar data include a real part and an imaginary part, also referred to as the in phase and quadrature parts, or the I and Q parts. These data are used to calculate, for example, the power of the signal, and the Doppler velocity of the signal. The real parts and the imaginary parts may be determined from using a quadrature demodulator, or any other method known to those of skill in the art.

Figure 3A:
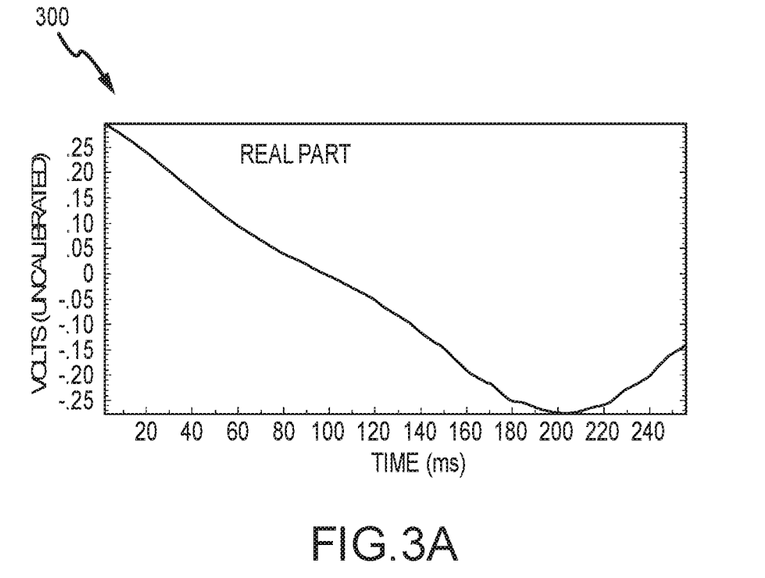
FIG. 3A depicts time series radar data 300, in accordance with an embodiment.
Figure 3B:
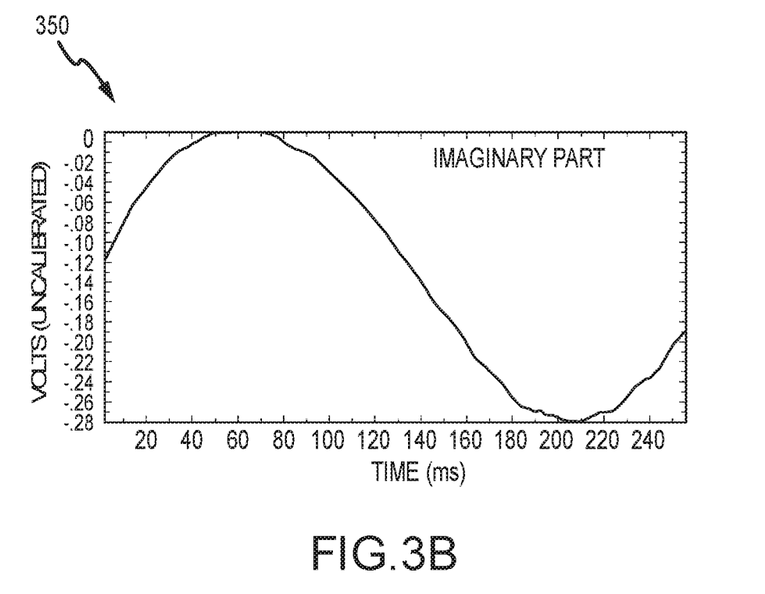
FIG. 3B depicts time series radar data 350, in accordance with an embodiment.

FIG. 3A depicts an example time series radar data 300, which corresponds to the real part of a raw time series radar data, and FIG. 3B depicts an example time series radar data 350, which corresponds to the imaginary part of a raw time series radar data. Time series radar data 300 and 350 correspond to the unfiltered Doppler spectrum 100 which shows a large clutter signal overlaid onto a weak weather signal. The x-axis of real time series radar data 300 and imaginary time series radar data 350 represent the time in milliseconds over which the time series are gathered, while the y-axis represents the voltage recorded at the receiver.

As may be seen in time series radar data 300 and 350, both plots show a relatively slow-changing features on a timescale of 1 to 256 ms. These slow-changing features generally correlate to ground clutter signal. Smaller variations over shorter time periods can be seen on top of the slow varying part. Thus, the time series radar data 300 and 350 each further include more rapidly changing features on a timescale of a few ms, that generally correspond to weather signal and/or noise.

Method 200 continues with step 204. In step 204, a clutter filter is applied to the time series radar data to generate a filtered time series radar data.

A clutter filter is a filter designed to remove clutter from radar data. In embodiments, the clutter filter may comprise any type of filter capable of removing at least some low velocity or slowly changing data from radar data. For example, the clutter filter may comprise in part a von Hann window or a Blackman window, as described above.

In embodiments, the clutter filter may comprise a regression filter. A regression filter is a high-pass filter that approximates an input signal with polynomial functions in the time domain. Because the ground clutter signal varies slowly compared to the weather echo signal in the time series radar data, the ground clutter signal may in some circumstances be approximated with a polynomial of a lower degree than that which would be required of the weather echo signal.

The polynomial fit may be performed by projecting the input signal samples $V(t)$, $t \in \{t_m\}$ onto the subspace W spanned by a basis B consisting of p+1 orthonormal polynomials. This set of polynomials may be given by $B=\{b_0(t), b_1(t), b_2(t), \ldots, b_p(t)\}$, where each $b_i(t) (0 \leq i \leq p)$ is a polynomial of ith degree; that is, $b_i(t) = c_{0i} + c_{1i} t + \ldots + c_{ii} t^i$. Then, the projection $\hat{V}(t)$ (i.e., the clutter signal) may be obtained by constructing a linear combination of the elements of the basis B, that is, the implication is that $\hat{V}(t)$ is in W, as given by Equation 1:

$$\hat{V}(t_m) = \sum_{i=0}^{p} \alpha_i b_i(t_m) \quad \text{(Equation 1)}$$

The residue $V_f(t_m) = V(t_m) - \hat{V}(t_m)$ may therefore be associated with the portion of the input signal that is not contained in the clutter subspace W [i.e., it is orthogonal to $\hat{V}(t)$]. The $\alpha_i$ coefficients are computed using the formula provided by Equation 2;

$$\alpha_i = \frac{(V, b_i)}{\|b_i\|^2} = \frac{\sum_{m=0}^{M-1} V(t_m) b_i(t_m)}{\sum_{m=0}^{M-1} b_i^2(t_m)} \quad i = 0, 1, \ldots, p, \quad \text{(Equation 2)}$$

where V and $b_i$ are vectors of the sampled input signal and the $b_i(t)$ polynomials, respectively.

Generalization in this analysis is not lost if each element of B is normalized such that $\|b_i\|=1$, where $\|b_i\|^2=(b_i, b_i)$. In addition, to simplify the notation the basis matrix B and the coefficient vector A may be defined as given in Equations 3 below:

$$B = \begin{bmatrix} b_0(t_0) & b_0(t_1) & \cdots & b_0(t_{M-1}) \\ b_1(t_0) & b_1(t_1) & \cdots & b_1(t_{M-1}) \\ \vdots & \vdots & \ddots & \vdots \\ b_p(t_0) & b_p(t_1) & \cdots & b_p(t_{M-1}) \end{bmatrix} \text{ and } A = \begin{bmatrix} \alpha_0 \\ \alpha_1 \\ \vdots \\ \alpha_p \end{bmatrix} \quad \text{(Equations 3)}$$

Then, assuming a normalized base, Eqs. (1) and (2) can be rewritten as $\hat{V}=B^T A$ and $A=BV$, respectively. Substitution of Equation 2 into Equation 1 produces $\hat{V}=B^T BV$. The residue or filtered signal $V_f$ may therefore be expressed according to Equation 4:

$$V_f = V - \hat{V} = (I - B^T B)V = FV, \quad \text{(Equation 4)}$$

where I is the identity matrix and the regression filter matrix is defined by Equation 5:

$$F = I - B^T B \quad \text{(Equation 5)}$$

In embodiments, the regression filter F may be linear and time varying.

In the embodiment described above, the polynomial functions utilized by the regression filter F comprise orthogonal polynomial functions. This is not intended to be limiting, however. As those in the art will readily understand, in further examples, the regression filter F may comprise any type of orthogonal polynomial functions known to those of skill. For example, the regression filter F may comprise Legendre polynomials.

In examples, the polynomial fit may be performed using least squares methods or, any other method of fitting an equation to data known to those of skill in the art.

Regression filter F may be applied to the time series radar data to generate a plurality of filtered time series radar data. The filtered time series radar data will include the residual time series radar data with at least a portion of the ground clutter signal removed.

Because the ground clutter signal varies slowly compared to the weather echo signal, in embodiments the ground clutter signal may be approximated with a polynomial of a relatively low degree compared to the faster-varying weather data.

Figure 4A:
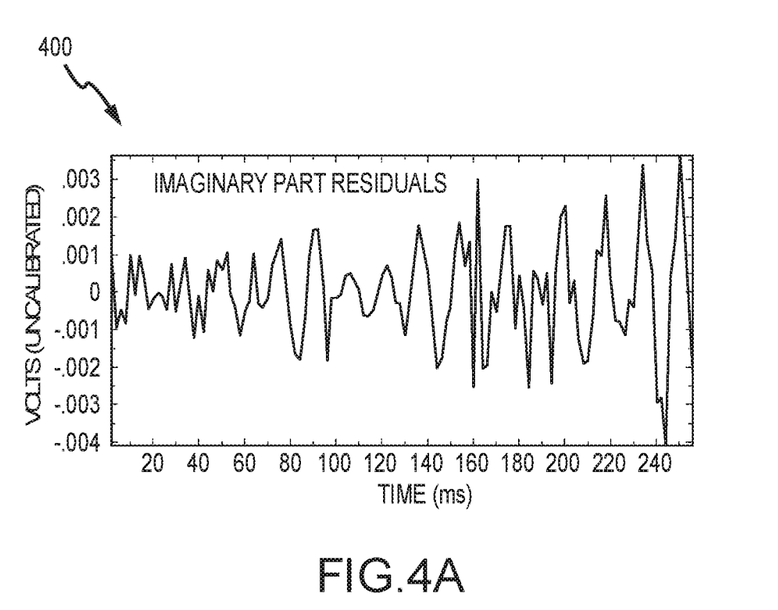
FIG. 4A depicts filtered time series radar data 400, in accordance with an embodiment.
Figure 4B:
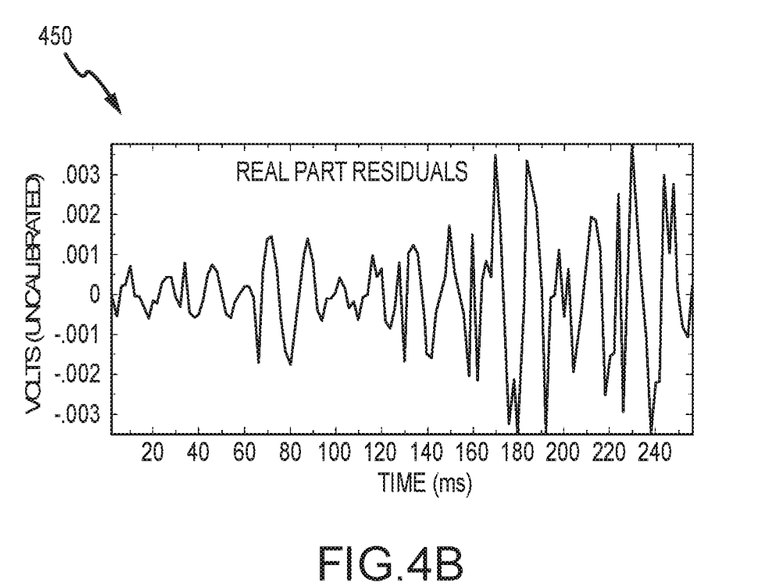

FIGS. 4A and 4B depict filtered time series radar data 400 and 450. Regression filtered first time series radar data 400 and 450 represent the residuals when a clutter filter, for example a regression fit curve, is subtracted from time series radar data 300 and 350. Clutter filtered first time series radar data 400 and 450 include the weather data and noise from time series radar data 300 and 350, without the ground clutter echo.

Method 200 continues with step 206. In step 206, a discrete Fourier transform is applied to the filtered time series radar data to generate a filtered frequency domain data. In embodiments, the discrete Fourier transform may comprise a fast Fourier transform.

Figure 5:
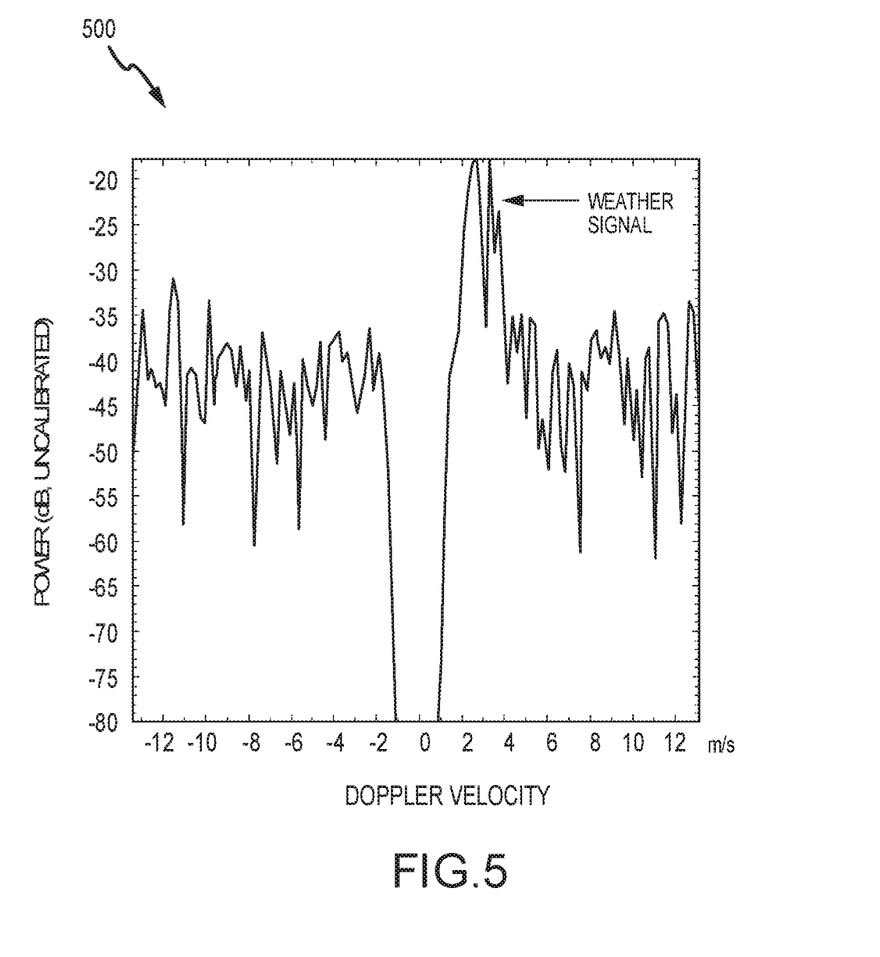
FIG. 5 depicts filtered frequency domain data 500, in accordance with an embodiment.

FIG. 5 depicts example filtered frequency domain data 500, which has been Fourier transformed into the Doppler spectrum. In the example, filtered frequency domain data 500 corresponds to the clutter filtered time series radar data 400, 450.

Method 200 continues with step 208. In step 208, a filter bias is determined for one or more filter biased frequency domain frequencies of the filtered frequency domain data based on a frequency response of the clutter filter. Filter bias is the attenuation of the weather signal due to application of a filter in the time domain. Filter bias is most easily visualized in the frequency domain, where some of the high velocity data outside a range of low clutter frequencies is attenuated.

Figure 6:
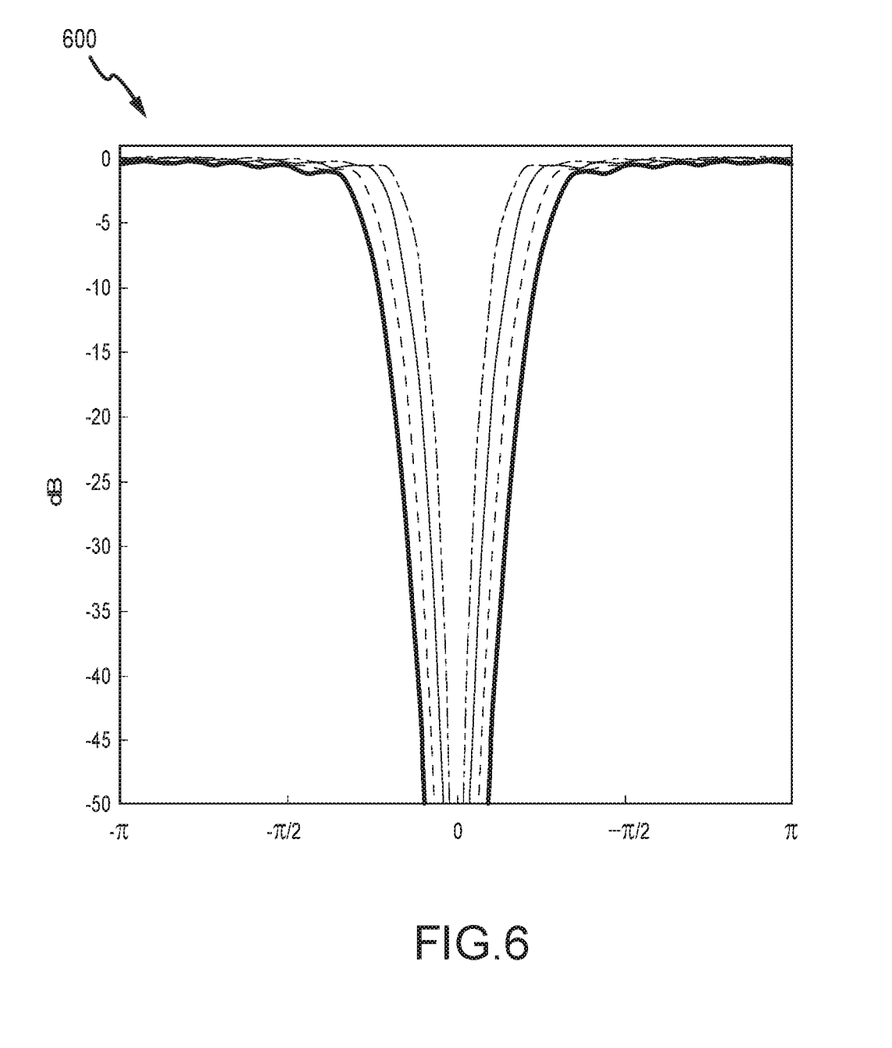
FIG. 6 depicts frequency response 600, in accordance with an embodiment.

FIG. 6 depicts a series of example frequency responses 600 for a several example clutter filters. Frequency responses 600 depict the frequency response for a regression filter using a series of polynomial orders. In FIG. 6, the notch size of the frequency response increases as the polynomial order increases.

Because regression filter matrix F depends only on polynomial order p and sample size M, in embodiments regression filter matrix F may be precomputed to achieve a specific notch width for a specific sampling scheme. For a specific notch width and/or sampling scheme, regression matrix F may then be used in real-time applications without being recomputed.

The frequency response may be determined directly from the clutter filter, as will be understood by those of skill, and it also may be used without being recomputed for a polynomial order p and a sample size M. In the particular example where the clutter filter is regression filter F, the clutter filter is linear (matrix multiplication is a linear transformation), time varying, and responds to the general input-output equation of the form:

$$y(t_l) = \sum_{m=0}^{M-1} f(t_l, t_m) \times (t_m); \; l=0, \ldots, M-1 \quad \text{(Equation 6)}$$

where $f(t_l, t_m)$ are the entries of regression filter F defined in Equation 5.

The frequency response $H(\omega)$ of a linear shift-invariant system can be defined as the change in magnitude and phase of a complex exponential signal $e^{j\omega t}$, which is passed through the system. More precisely, let $x(t)$ and $y(t)$ be the input and output of the clutter filter whose impulse response is given by $h(t)$. If $x(t)=e^{j\omega t}$, then the output $y(t)$ can be obtained by convolving $x(t)$ with $h(t)$, that is, $$y(t) = h(t) * x(t) = \sum_{t' \in \{t_m\}} h(t')x(t-t') = \quad \text{(Equation 7)}$$

$$\sum_{t' \in \{t_m\}} h(t')e^{j\omega(t-t')} = [\sum_{t' \in \{t_m\}} h(t')e^{-j\omega t'}]e^{j\omega t} = H(\omega)e^{j\omega t}$$

so that $H(\omega)$ describes the frequency response at $\omega$.

As previously stated, a regression filter is time varying. However, the output to a given signal of $M_f$ samples is always the same regardless of when this block of $M_f$ samples is encountered in the filtering process. This feature may be exploited by deriving an expression for the frequency response of the regression filter using Equation 6 in an analogous fashion as Equation 7. That is, considering a regression filter whose input is an exponential of the form $e^{j\omega t}$. The output of this filter is:

$$y(t_l) = \sum_{m=0}^{M_f-1} f(t_l, t_m)e^{j\omega t_m} = \quad \text{(Equation 8)}$$

$$\left[\left(\sum_{m=0}^{M_f-1} f(t_l, t_m)\exp[j\omega t_m]\right)\exp[j\omega t_l]\right]\exp[j\omega t_l];$$

$$l = 1, \ldots, M_f$$

Then, noting the form of Equation 8, it is possible to define:

$$H(\omega, t_l) = F_1(-\omega)\exp[-j\omega t_l] \quad \text{(Equation 9)}$$

where $F_1(\omega) = \sum_{m=0}^{M_f-1} f(t_l, t_m)e^{-j\omega t_m}$ is the discrete Fourier transform (DFT) of $f(t_l, t_m)$ with fixed l. Finally, accounting for all of the values of l in the $M_f$ sample segment:

$$H(\omega) = \frac{1}{M_f}\sum_{l=0}^{M_f-1} f_1(-\omega)\exp[-j\omega t_l]. \quad \text{(Equation 10)}$$

Using the results of Equation 5, each entry in regression filter F is given by:

$$f(t_l, t_m) = \delta(t_l - t_m) - \sum_{i=0}^{p} b_i(t_l)b_i(t_m) \quad \text{(Equation 11)}$$

where $\delta(t)$ is the usual discrete-time impulse sequence. The DFT of Equation 11 is:

$$F_1(\omega) = \exp[-j\omega t_1] - \sum_{i=0}^{p} b_i(t_l)B_i(\omega) \quad \text{(Equation 12)}$$

where $B_i(\omega)$ is the DFT of $b_i(t)$. Then, $$H(\omega) = 1 - \frac{1}{M_f}\sum_{i=0}^{p} B_i(-\omega)\left[\sum_{l=0}^{M_f-1} b_i(t_l)\exp[-j\omega t_l]\right]. \quad \text{(Equation 13)}$$

and finally frequency response $H(\omega)$ of the regression filter F can be given by:

$$H(\omega) = 1 - \frac{1}{M_f}\sum_{i=0}^{p} |B_i(\omega)|^2. \quad \text{(Equation 14)}$$

Because frequency response $H(\omega)$ is real, the phase response of regression filter F is constant and we only need to be concerned about its magnitude response. The frequency response $H(\omega)$ of the regression filter F depends on the number p of elements in B (i.e., the maximum degree of the polynomials used for approximation) and on the number of samples $M_f$ in each processing block.

Figure 7A:
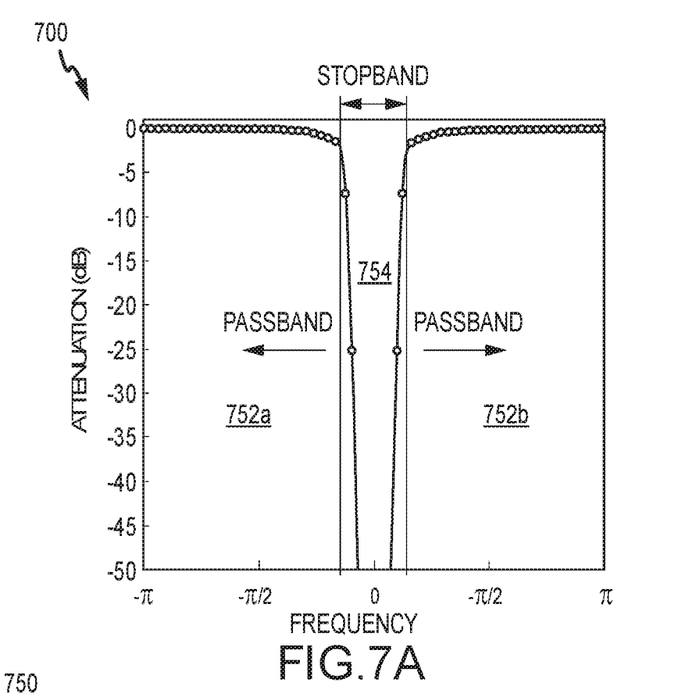
FIG. 7A depicts frequency response 700.
Figure 7B:
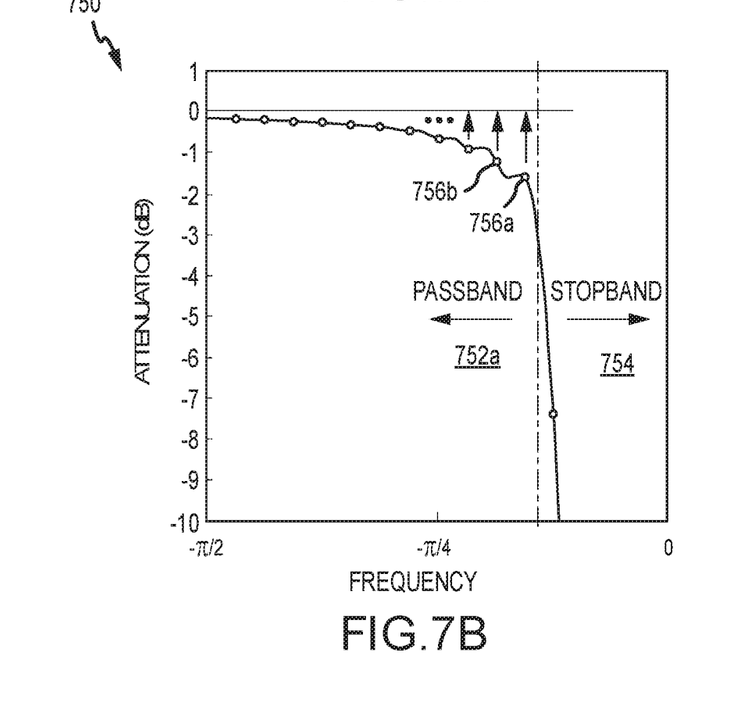
FIG. 7B depicts a detail of frequency response 700.

FIG. 7A depicts frequency response 700, which includes a frequency response in decibels (dB) for a regression filter using an 11$^{th}$ order polynomial for 124 sample size time series radar data over a frequency range from $-\pi$ to $\pi$. FIG. 7B depicts a further detail of frequency response 700, including only the frequencies from the range of $-\pi/2$ to zero.

FIGS. 7A and 7B depict a passband region 752a, 752b and a stopband region 754 of the frequency range. The stopband region 754 includes frequencies where the clutter signal is most likely to reside. The passband region 752a, 752b, which includes frequencies that are greater than an absolute value of a predetermined passband frequency, includes frequencies where the clutter signal, which is slow-moving, is unlikely to reside.

As may be seen in the detail of frequency response 700, there will be a bias, or attenuation of signal, based on applying a clutter filter to the time series radar data to the power of the filtered frequency domain data within the passband region 752a, 752b. Because the passband region 752a, 752b includes weather data, but is unlikely to include clutter data, this biasing of data is therefore undesirable, and can lead to a lower signal to noise ratio in the weather data.

The one or more filter biased filter biased frequency domain frequencies comprise frequencies inside the passband 752a, 752b that have a filter bias. For example, as may be seen in FIG. 7b, filter biased frequency domain frequency value 756a has a filter bias of 2 dB, and filter biased frequency domain frequency value 756b has a filter bias of 1.5 dB, as determined from the frequency response 700 of the clutter filter.

Method 200 continues with step 212. In step 212, the filtered frequency domain data is corrected by adding the filter bias to the filtered frequency domain data at the one or more filter biased frequency domain frequencies to generate a filtered and bias corrected frequency domain data.

For example, the filtered frequency domain data may be corrected by adding the filter bias value of 2 dB to filter biased frequency domain frequency value 756a and a filter bias value of 1.5 db to filter biased frequency domain frequency value 756b, to generate the filtered and bias corrected frequency domain data.

By correcting for filter bias generated when filtering time series radar data for clutter, it may be possible to provide a weather radar data with at least one of a lower standard deviation, or a higher signal to noise ratio. This may provide more robust and accurate weather data.

In examples, method 200 may comprise further steps. For example, method 200 may further comprise steps 210 and 212. In step 210, a passband may be received comprising a frequency range, and in step 212 the filtered frequency domain data may be corrected by adding the filter bias to the filtered frequency domain data at the one or more filter biased frequency domain frequencies to generate the filtered and bias corrected frequency domain data may further comprise determining that the one or more filter biased frequency domain frequencies are within the passband. In embodiments, the passband may comprise the absolute value of the frequency range, as described above.

By clearly defining a passband or a stopband, it may be possible to further improve the accuracy of weather radar data.

In further embodiments, method 200 may further comprise step 214. In step 214, one or more radar variables may be determined from the filtered time series radar data. For example, the one or more radar variables may include the total return power, velocity, spectrum width, differential reflectivity, differential phase, or any other radar variable known to those of skill in the art.

Figure 8:
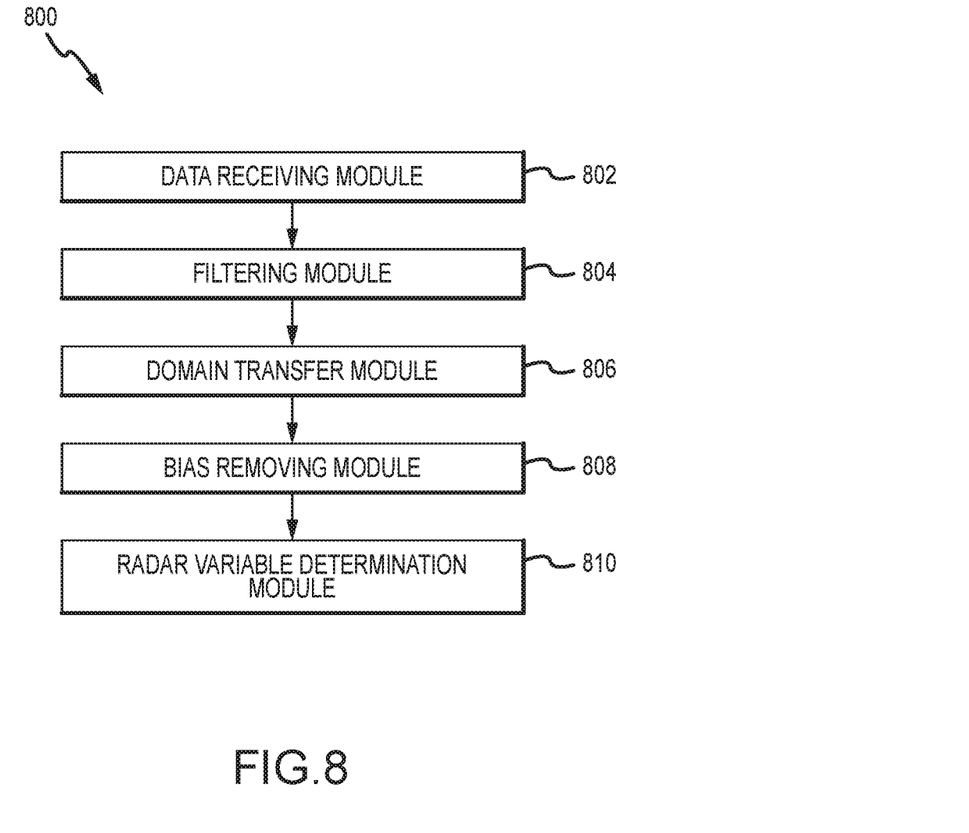
FIG. 8 depicts system 800, in accordance with an embodiment.

FIG. 8 depicts system 800, in accordance with a further embodiment. System 800 may be used to remove ground clutter from time series radar data.

System 800 includes data receiving module 802, filtering module 804, domain transfer module 806, a bias removing module 808. Data receiving module 802 may execute step 202, filtering module 804 may execute step 204, domain transfer module 806 may execute step 206, and bias removing module 808 may execute any of steps 208, 210, or 212, as described above.

In further embodiments. System 800 may further include radar variable determination module 810, which may execute step 214, as described above.

System 800 may further perform any of the variations described above with respect to method 200.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. Accordingly, the scope of the embodiments described above should be determined from the following claims.

What is claimed is:

1. A method for removing ground clutter data from time series radar data, the method comprising:
    receiving the time series radar data;
    applying a clutter filter to the time series radar data to generate a filtered time series radar data;
    applying a discrete Fourier transform to the filtered time series radar data to generate a filtered frequency domain data;
    determining a filter bias for one or more filter biased frequency domain frequencies of the filtered frequency domain data based on a frequency response of the clutter filter; and
    correcting the filtered frequency domain data by adding the filter bias to the filtered frequency domain data at the one or more filter biased frequency domain frequencies to generate a filtered and bias corrected frequency domain data.

2. The method as claimed in claim 1, further comprising: receiving a passband comprising a frequency range, and wherein correcting the filtered frequency domain data by adding the filter bias to the filtered frequency domain data at the one or more filter biased frequency domain frequencies to generate the filtered and bias corrected frequency domain data further comprises determining that the one or more filter biased frequency domain frequencies are within the passband.

3. The method as claimed in claim 1, wherein the clutter filter is a regression filter.

4. The method as claimed in claim 3, wherein the regression filter comprises an n-polynomial fit, and determining the filter bias for the one or more filter biased frequency domain point includes determining the filter bias for the regression filter having the n-polynomial fit and a time series radar data length.

5. The method as claimed in claim 1, further comprising: determining one or more radar variables from the filtered and bias corrected frequency domain data.

6. A system for removing ground clutter data from time series radar data, the system comprising:
    a data receiving module operable to receive time series radar data;
    a filtering module operable to apply a clutter filter to the time series radar data to generate a filtered time series radar data;
    a domain transfer module operable to apply a discrete Fourier transform to the filtered time series radar data to generate a filtered frequency domain data;
    a bias removing module operable to determine a filter bias for one or more filter biased frequency domain frequencies of the filtered frequency domain data based on a frequency response of the clutter filter, and correct the filtered frequency domain data by adding the filter bias to the filtered frequency domain data at the one or more filter biased frequency domain frequencies to generate a filtered and bias corrected frequency domain data.

7. The system as claimed in claim 6, further comprising: wherein the bias removing module is further configured to receive a passband comprising a frequency range, and correct the filtered frequency domain data by adding the filter bias to the filtered frequency domain data at the one or more filter biased frequency domain frequencies to generate the filtered and bias corrected frequency domain data further comprises determining that the one or more filter biased frequency domain frequencies are within the passband.

8. The system as claimed in claim 7, wherein the clutter filter is a regression filter.

9. The system as claimed in claim 8, wherein the regression filter comprises an n-polynomial fit, and determining the filter bias for the one or more filter biased frequency domain point includes determining the filter bias for the regression filter having the n-polynomial fit and a time series radar data length.

10. The system as claimed in claim 6, further comprising: a radar variable determination module configured to determine one or more radar variables from the filtered and bias corrected frequency domain data.

* * * * *